US012669108B2

(12) United States Patent
Herrig et al.

(10) Patent No.: US 12,669,108 B2
(45) Date of Patent: Jun. 30, 2026

(54) DAMPING SYSTEM FOR WIND TURBINE BLADE EDGE VIBRATION STABILIZATION

(71) Applicant: LM WIND POWER A/S, Kolding (DK)

(72) Inventors: Andreas Herrig, Salzbergen (DE); Hartmut Scholte-Wassink, Salzbergen (DE); Satya Mohan Vamsi Andalam, Bengaluru (IN)

(73) Assignee: LM Wind Power A/S, Kolding (DK)

( * ) Notice: Subject to any disclaimer, the term of this patent is extended or adjusted under 35 U.S.C. 154(b) by 0 days.

(21) Appl. No.: 18/280,938

(22) PCT Filed: May 6, 2022

(86) PCT No.: PCT/EP2022/062344
§ 371 (c)(1),
(2) Date: Sep. 7, 2023

(87) PCT Pub. No.: WO2022/234118
PCT Pub. Date: Nov. 10, 2022

(65) Prior Publication Data
US 2024/0084778 A1     Mar. 14, 2024

(30) Foreign Application Priority Data

May 7, 2021     (EP) ..................................... 21172778

(51) Int. Cl.
*F03D 1/06*          (2006.01)
*F03D 7/02*          (2006.01)
(52) U.S. Cl.
CPC ......... *F03D 1/0675* (2013.01); *F03D 1/0679* (2023.08); *F03D 7/0298* (2023.08); *F05B 2260/964* (2013.01)

(58) Field of Classification Search
CPC .... F03D 1/0675; F03D 1/0679; F03D 1/0682; F03D 7/0296; F03D 7/0298;
(Continued)

(56) References Cited

U.S. PATENT DOCUMENTS

2008/0107540 A1*  5/2008  Bonnet ................. F03D 1/0675
                                                          415/119
2023/0020641 A1*  1/2023  Sloth ..................... F03D 1/0675

FOREIGN PATENT DOCUMENTS

DE       20211001901 U1     4/2011
WO       WO-99/32789      *  7/1999
(Continued)

OTHER PUBLICATIONS

English machine translation of DE 20 2011 001 901 U1, Jul. 26, 2024.*
(Continued)

*Primary Examiner* — Christopher Verdier
(74) *Attorney, Agent, or Firm* — Dority & Manning, P.A.

(57)               ABSTRACT
A wind turbine blade extending in a longitudinal direction between a root end and a tip end and comprising a shell having an outer surface defining a pressure side and a suction side, a leading edge and a trailing edge, a chord having a chord length extending between the leading edge and the trailing edge and a load-bearing structure extending in the longitudinal direction, the wind turbine blade further comprises a dampening system comprising a blade dampening body attached exteriorly to the load-bearing structure or exteriorly to the outer surface of the shell, at least a first dampener located within the blade dampening body and positioned with a component in the chordwise direction of the blade and adapted to absorb vibrational forces the wind turbine blade is subjected to.

10 Claims, 7 Drawing Sheets

(58) Field of Classification Search
CPC .... F03D 17/015; F03D 17/017; F03D 80/005;
F05B 2270/334; F05B 2260/96; F05B
2260/964
See application file for complete search history.

(56) References Cited

FOREIGN PATENT DOCUMENTS

| WO | WO-9932789 A1 * | 7/1999 | ............... F01D 5/16 |
|----|-----------------|--------|--------------------------|
| WO | 2021/129913 A1  | 7/2021 |                          |

OTHER PUBLICATIONS

Search Report dated Nov. 9, 2023 issued in corresponding European Application No. 21172778.9.
Office Action dated Aug. 7, 2024 issued in corresponding European Application No. 21172778.9.

* cited by examiner

DAMPING SYSTEM FOR WIND TURBINE BLADE EDGE VIBRATION STABILIZATION

This is a National Phase Application filed under 35 U.S.C. 371 as a national stage of PCT/EP2022/062344, filed May 6, 2022, an application claiming the benefit of European Application No. 21172778.9, filed May 7, 2021.

TECHNICAL FIELD

The present disclosure relates to a turbine blade with a dampening system for absorbing vibrational forces experienced by the turbine blade.

BACKGROUND

In order to extract more power from a wind turbine, a number of factors can be adjusted, but the overall driver for extracting more energy is the size of the rotor and hence the length of the wind turbine blades. In recent years, the length of the blades has increased quite rapidly. A longer blade can extract more power from the wind but may on the other hand also experience added vibrations. The blade may therefore vibrate in the wind, which will put strain on the joints and structure of the wind turbine blade. These vibrations could be edgewise vibrations that could seriously damage the integrity of the blade and result in the blade disintegrating or cracking under the stress.

To alleviate the vibrations experienced by the wind turbine blade, dampening systems may be incorporated into the design of the wind turbine blade. These dampening systems are placed within the blade structure and adapted to absorb the vibrations of the blade. Typically, these dampeners are passive tuned mass dampeners.

However, current wind turbine dampening systems are ineffective in absorbing the vibrations experienced by the wind turbine blade and are often cumbersome to install and heavy. Further, most dampening systems cannot be retrofitted, adapted to an existing blade, or tuned without disassembling the blade.

OBJECT OF THE INVENTION

It is an object of the present invention to alleviate some of the problems of existing wind turbine blades or to provide an alternative to the prior art.

SUMMARY

Thus, the above described objects are intended to be obtained in a first aspect by providing a wind turbine blade, which extends in a longitudinal direction between a root end and a tip end and comprising a shell having an outer surface defining a pressure side and a suction side, a leading edge and a trailing edge, a chord having a chord length extending between the leading edge and the trailing edge and a load-bearing structure extending in the longitudinal direction, preferably from the root end to the tip end, the wind turbine blade may further comprise a dampening system, which comprises a blade dampening body attached exteriorly to the load-bearing structure or exteriorly to the outer surface of the shell, at least a first dampener which may be located within the blade dampening body and positioned with a component in a chordwise direction of the blade and adapted to absorb vibrational forces the wind turbine blade is subjected to.

Having a dampening body that is exteriorly or externally attached to the load-bearing structure or to the shell of the wind turbine blade allows for an improved dampening system, as internal structures will not limit the functioning of the dampener. The dampener can therefore be made longer, such that the dampening effect can be increased with the same mass or a smaller mass can be used to achieve the same dampening effect. The dampening system may be attached at any point along the blade, such as the tip of the blade. The position of the dampener will determine which kind of vibration will be absorbed and the location and position of the dampener can therefore be changed to tune the dampening system to different vibration types and frequencies.

The term "exteriorly" is to be understood to mean being arranged closer to the surroundings than the load-bearing structure or the blade shell. In both setups, the blade dampening body is preferably arranged exteriorly to the load-bearing structure, i.e. a spar cap, of the wind turbine blade.

Further, it is to be understood that the dampening system is configured to remain part of or be attached to the blade during use of the blade, i.e. when the wind turbine blade is arranged on a wind turbine rotor. Thus, according to the invention, the dampening system is configured to be part of the blade under design operational conditions for a wind turbine and, in particular, to be able to remain part of the blade at the rotational speeds at the design point of the wind turbine.

Accordingly, it is also understood that the above objectives are obtained by a wind turbine comprising a number of blades, preferably two or three, of the first aspect. The wind turbine is preferably a horizontal axis wind turbine (HAWT).

In a preferred embodiment, the dampening body is arranged to extend along a part of the suction side and/or the pressure side of the wind turbine blade, preferably substantially in a chordal direction. Preferably, the dampening body is arranged to extend across at least a part of the load-bearing structure of the wind turbine blade, preferably a spar cap of the wind turbine blade.

The dampening system may therefore in some embodiments be attached to the load-bearing structure, which would be advantageous in segmented wind turbine blades, such that the dampening body is disposed between blade sections, such as a root section and a tip section, or in other embodiments directly to the shell, preferably the outer surface of the shell. The dampening system will therefore absorb some of the vibrations experienced by the blade and ensure that the total stresses experienced will be lowered.

Having the dampening body externally attached to the blade may further allow the dampener to be longer and allow more actuation of the damper mass of the dampener, since the internal blade structure will not limit the dimensions of the dampening system, and as such the length of the dampener can be increased without much consideration to the internal structure of the blade. This may have the effect that the dampening body and thereby the dampener may be extended along the entire chord length of the turbine blade, which will increase the dampening effect, and the damper mass may accordingly be decreased. The length of the dampener may therefore be more than the local chord length of the blade. Further, it may allow for retrofitting of the dampening system around/to the blade in an easy manner, such that the dampening system may allow for an interchangeable, retrofittable and modular dampening system.

In some embodiments, the dampening body may be placed such that the dampener is placed with a component in the flap wise direction, such that flap wise oscillations, coupled modes and/or torsional oscillations could further be adsorbed.

The placement of the dampening system on the blade may be such that the system is adapted to absorb a specific vibration frequency. Further, a plurality of dampening systems or dampeners may further be attached to the blade and tuned to absorb the same or different vibrations and frequencies. This will allow a broad range of vibrations to be absorbed.

In some embodiments, the blade dampening body may be protruding or partially protruding into the shell. In preferred embodiments, the protruding section of the blade dampening body only acts to provide a motion path for the moving mass, rather than as the attachment structure. The blade dampening body protruding into the shell therefore allows for a longer movement path of the dampening mass in the case of a tuned mass dampener and consequently an improved dampening effect.

In such an embodiment, some of the dampening body may be protrude into the shell and one side of the dampening system may be exposed to the environment. This may allow for the attachment of the dampening system by removing a section of the shell and attaching the dampening body in the removed section. It may also allow for a straight dampener to be installed in a curved blade shell. In some embodiments, only parts of the dampeners and dampening body are protruding into the shell.

In some embodiments, the dampener is a liquid dampener or a mass dampener, especially a tuned mass dampener. In such embodiments the dampeners are passive dampeners. The dampeners may in some embodiments be wrapped around the wind turbine blade in a chord-wise direction or along the chord length in order to maximize the dampening. In other embodiments, active dampeners may be used.

In some embodiments, the blade dampening body may further comprise a fastener connecting the blade dampening body to the load bearing structure of the blade or to the shell.

In some embodiments, the fastener may be any of a bolt/nut connection, a screw connection, a glue connection, a clamping connection, or an interlocking connection.

In some embodiments, the dampening body may be attached at the suction side or pressure side or both, or a rib connecting both the pressure and suction side.

In some embodiments, the dampener and/or dampening body may be dimensioned to follow the contour of the shell. This will allow for snug-fit attachment of the dampening body to the shell and will further allow for an aerodynamical stable attachment. When the dampening system is placed between sections in a segmented turbine blade, the dampening body may be dimensioned such that the dampening body provides a flush transition between sections and may provide at least part of the aerodynamical profile for the transition between sections.

In some embodiments, the dampening body may partially or fully encase the blade structure or blade shell in a chordwise direction of the blade. In some embodiments, the dampening body is dimensioned to wrap around the blade in the chordwise direction in order to provide an improved fastening arrangement.

In some embodiments, the dampening system may comprise a second dampener, the first dampener may be located at the suction side and the second dampener may be located at the pressure side or both dampeners being placed in parallel at the same side or off-set or at different locations along the blade. This will ensure that the dampening of the blade is uniform and will, in some embodiments, ensure that the structural characteristics of the turbine blade are symmetrical. Further, this allows for low-profile integration, redundancy and/or tuning the dampeners to different frequency characteristics by placing them at different location of the wind turbine. Further, in some embodiments, offsetting the center of gravity of the damping masses from the blade axis could introduce beneficial coupling into torsional components. The first and second dampener may be located in different dampening bodies.

In some embodiments, the blade dampening body may have the shape of a fairing or be placed within a fairing, dimensioned to create a smooth transition between the dampening body and the shell for reducing drag on the wind turbine blade and on the dampening system. This will ensure that the blade dampening body will create minimal turbulence along the blade.

In some embodiments, the dampener comprises an actuator, such as a hydraulic, pneumatic or electromechanical actuator, moving a mass along the chordwise direction of the blade.

In the embodiments wherein a hydraulic actuator is used, the mass may be moved according to the flow of hydraulic fluid flowing in the actuator. Installing the actuator externally to the blade will allow for moving a small mass at higher speeds over a larger distance, leading to an improved damping effect with a lower weight penalty. Further, actively moving the mass by the actuator and amplifying the acceleration of the mass, for example in the case of the hydraulic actuator using pressurised hydraulic fluid, will lead to better dampening characteristics of the dampening system.

The movement of the mass may therefore create a counter-phase acceleration by moving the mass in the same direction as the vibrations experienced by the blade and thereby cancelling the vibrations.

In some embodiments, the dampening system may further comprise:

an acceleration sensor, a control valve, preferably integrally formed with the acceleration sensor, a hydraulic generator for supplying pressurised hydraulic fluid to the hydraulic actuator by flow through the mass-activated valve, wherein the control valve is configured to change the flow of the pressurised hydraulic fluid to move the actuator in the same direction of the sensed acceleration by the acceleration sensor.

In some embodiments, the dampening system may further comprise:

first pressure supply lines connecting the hydraulic generator to the control valve and comprising a high-pressure supply line and a low pressure return line, and a second pressure supply line connecting the valve to the actuator and comprising a first and second supply line, the control valve connecting the first pressure supply lines to the second pressure supply lines, the control valve may be configurable to obtain:

a first configuration, where the high-pressure supply line is connected to the first supply line and the low-pressure supply line is connected to the second supply line, a second configuration, where the high-pressure supply line is connected to the second supply line and the low-pressure supply line is connected to the first supply line, and

5 a third configuration, where first pressure supply lines and second pressure supply lines are not connected or equally connected, creating zero flow.

In this embodiment, the control valve will, based on the sensed acceleration, change the flow of hydraulic fluid, such that the actuator will move the mass in the same direction as the direction of acceleration.

In some embodiments, the acceleration sensor and control valve may be separate components.

Such a system could in one embodiment be pressure signal-based or in another embodiment be electronic signal based, wherein a controller controls the flow of the hydraulic fluid based on electronic signals.

In some embodiments, the pressure-based system's control valve may be a mass-activated control valve, such as such as a spring-loaded acceleration sensor integrally formed with the valve.

A pressure signal-based system may be advantageous, because it allows for an improved passive dampener that will control the movement of the hydraulic fluid based on the sensed acceleration, such as the tip acceleration, by the mass-activated control valve. Further, the pressure-based implementation may remove the need for a conducting cable or a processor for controlling the flow, making it insensitive to lightning strikes and simpler to attach to the blade structure. Further, having the acceleration sensor incorporated into the control valve allows for higher fidelity control of the oscillation.

In some embodiments, the acceleration sensor may comprise an adjustable spring, with regard to stiffness and zero-load point and pressure equilibration channels, to allow tuning of the dampening systems frequency response characteristics. Each of the first, second and third configuration therefore corresponds to different channel configurations, such that the adjustable spring will change the connection between the channels accordingly.

In some embodiments, the dampening system may further include conducting cables and a processor that actively controls the control valve to change the flow of the hydraulic fluid and the movement of the mass or active components to control the characteristics of the active signal-based system.

In some embodiments, the hydraulic generator may be housed within a hub joint or a cavity of the blade.

In some embodiments, the dampening system may further comprise a hydraulic amplifier connected to the hydraulic actuator for active controlling of the sensitivity of the dampening system.

In some embodiments, the dampening system may further comprise a controller that controls the configuration of the control valve and/or the pressure ratio between the high-pressure line and low-pressure line based on the sensed acceleration by the acceleration sensor.

In some embodiments, the controller may further control the hydraulic amplifier. The controller may control a control valve that can activate the hydraulic amplifier or adjust the amplification ratio.

In some embodiments, the dampening body may be located within the spanwise outer 30% of the length of wind turbine blade, preferably within the outer 15% of the length of the wind turbine blade, most preferably within the outer 10% of the length of the wind turbine blade, and in an anti-node of the oscillation shape to be dampened.

A person skilled in the art will appreciate that any one or more of the above aspects of this disclosure and embodiments thereof may be combined with any one or more of the other aspects of this disclosure and embodiments thereof.

BRIEF DESCRIPTION OF THE DRAWINGS

Embodiments of this disclosure will be described in more detail in the following with regard to the accompanying figures. The figures show one way of implementing the present invention and are not to be construed as being limiting to other possible embodiments falling within the scope of the attached claim set.

DETAILED DESCRIPTION OF THE INVENTION

In the following figure description, the same reference numbers refer to the same elements and may thus not be described in relation to all figures. The figures show one way of implementing the system and is not to be construed as being limiting to other possible embodiments falling within the scope of the attached claim set.

Figure 1:
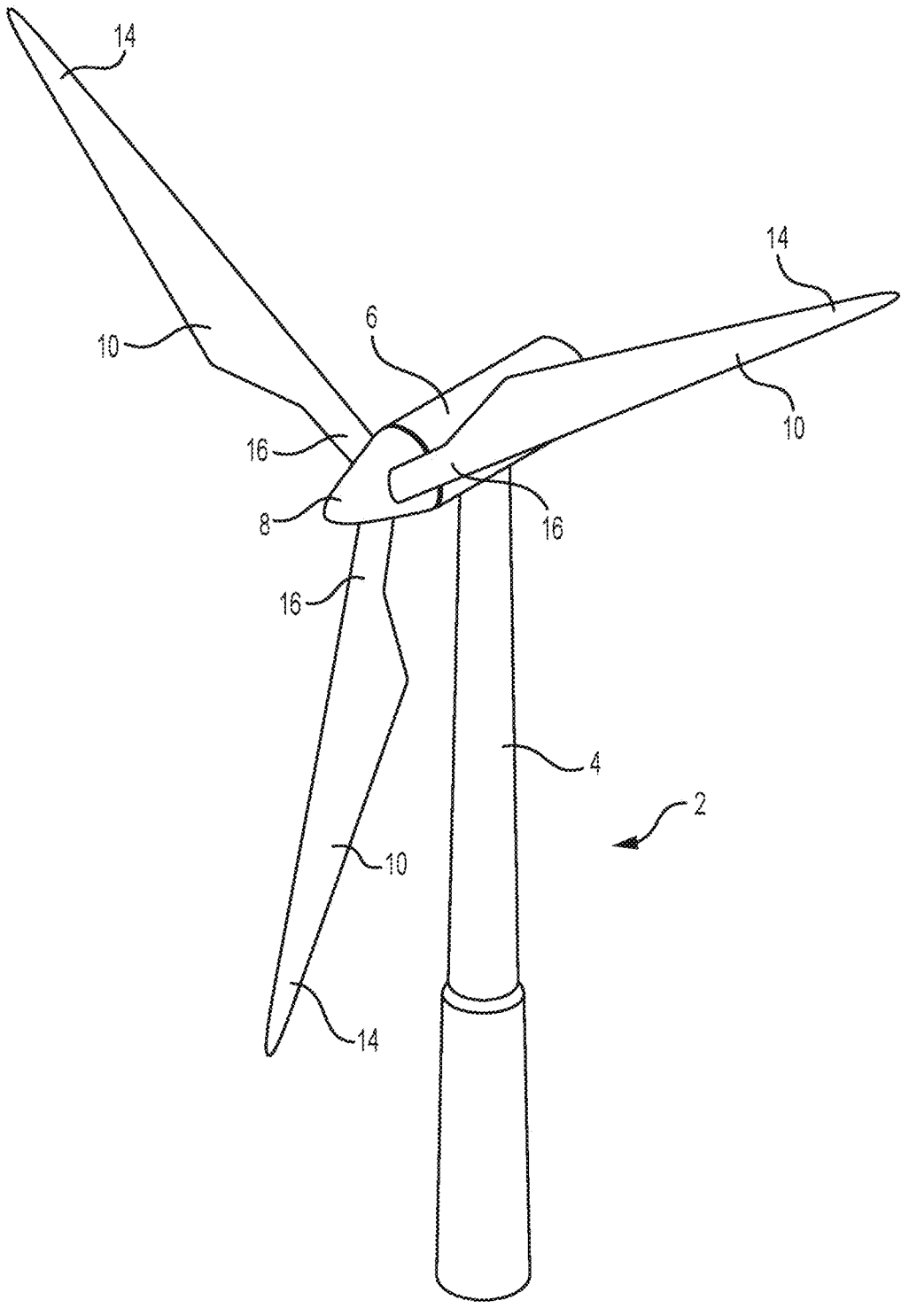
FIG. 1 is a schematic perspective view of a wind turbine.

FIG. 1 illustrates a conventional modern upwind wind turbine 2 according to the so-called "Danish concept" with a tower 4, a nacelle 6 and a rotor with a substantially horizontal rotor shaft which may include a tilt angle of a few degrees. The rotor includes a hub 8 and three blades 10 extending radially from the hub 8, each having a blade root 16 nearest the hub and a blade tip 14 furthest from the hub 8.

Figure 2:
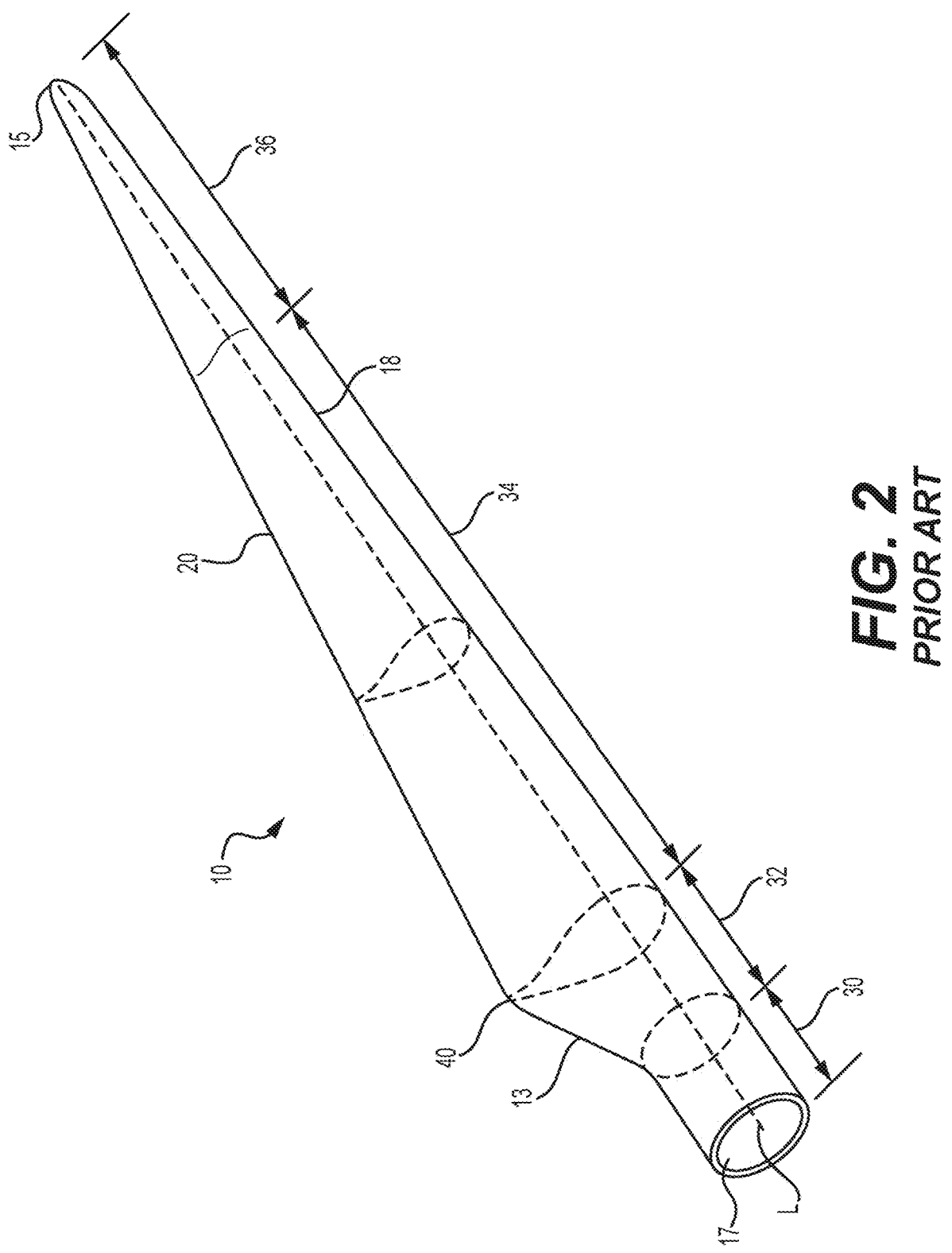
FIG. 2 is a schematic perspective view of a wind turbine blade for a wind turbine as shown in FIG. 1.

FIG. 2 shows a schematic view of an exemplary wind turbine blade 10. The wind turbine blade 10 has the shape of a conventional wind turbine blade with a root end 17 and a tip end 15 and comprises a root section 30 closest to the hub, a profiled section 34 furthest away from the hub and a transition section 32 between the root section 30 and the profiled section 34. The blade 10 comprises a leading edge 18 facing the direction of rotation of the blade 10, when the blade is mounted on the hub 8, and a trailing edge 20 facing the opposite direction of the leading edge 18.

The profiled section 34 has an ideal or almost ideal blade shape with respect to generating lift, whereas the root section 30 due to structural considerations has a substantially circular or elliptical cross-section, which for instance makes it easier and safer to mount the blade 10 to the hub. The diameter (or the chord) of the root section 30 may be constant along the entire root section 30. The transition section 32 has a transitional profile gradually changing from the circular or elliptical shape of the root section 30 to the airfoil profile of the profiled section 34. The chord length of the transition section 32 typically increases with increasing distance r from the hub. The profiled section 34 has an airfoil profile with a chord extending between the leading edge 18 and the trailing edge 20 of the blade 10. The width of the chord decreases with increasing distance r from the hub. The different sections of the blade are commonly referred to as the airfoil of the blade. The profiled section as shown in FIG. 2 may be made up of a number of sections that is assembled. In such cases the wind turbine blade is a segmented blade construction.

A shoulder 40 of the blade 10 is defined as the position, where the blade 10 has its largest chord length. The shoulder 40 is typically provided at the boundary between the transition section 32 and the profiled section 34.

It should be noted that the chords of different sections of the blade normally do not lie in a common plane, since the blade may be twisted and/or curved (i.e., pre-bent), thus providing the chord plane with a correspondingly twisted and/or curved course, this being most often the case in order to compensate for the local velocity of the blade being dependent on the radius from the hub.

Figures 3A, 3B:
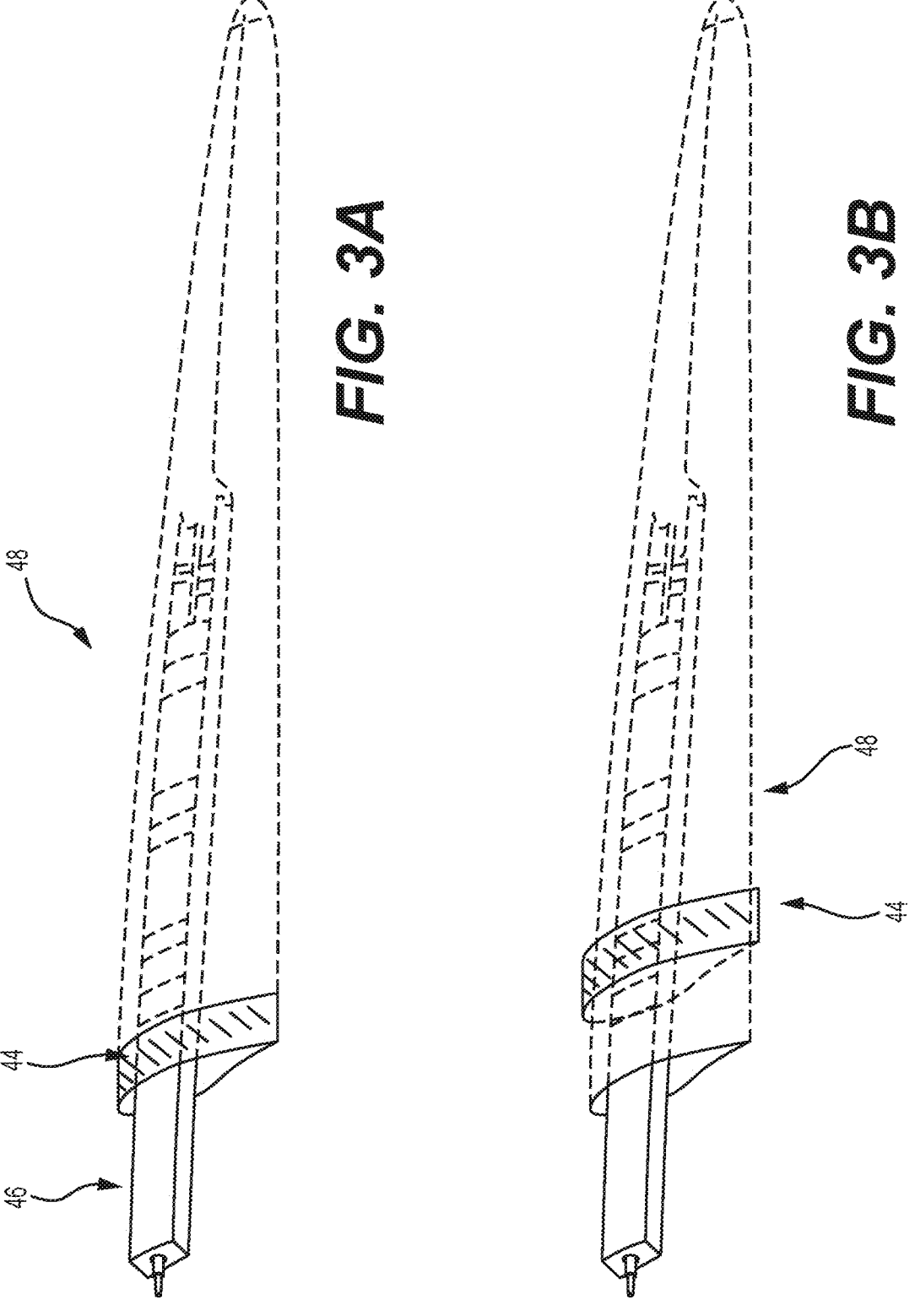
FIGS. 3A and 3B show an embodiment of the placement of the dampening system to a wind turbine blade.

Referring to FIGS. 3A and 3B, an embodiment of the invention is shown. Two different embodiments illustrating the placement of the dampening body are shown in FIGS. 3A and 3B. In FIGS. 3A and 3B, a blade extending in a longitudinal direction between a root end 17 and a tip end and comprising a shell 48 having an outer surface defining a pressure side and a suction side, a leading edge 18 and a trailing edge 20, a chord having a chord length extending between the leading edge 18 and the trailing edge 20 and a load-bearing structure 46 extending in the longitudinal direction is shown. In FIG. 3A, a blade dampening body is attached to the load bearing structure 46 and in FIG. 3B the dampening system is attached to the shell 48. In both cases, the dampening system is placed externally onto the blade. However, the dampening system could locally protrude into the shell section.

Figure 4A:
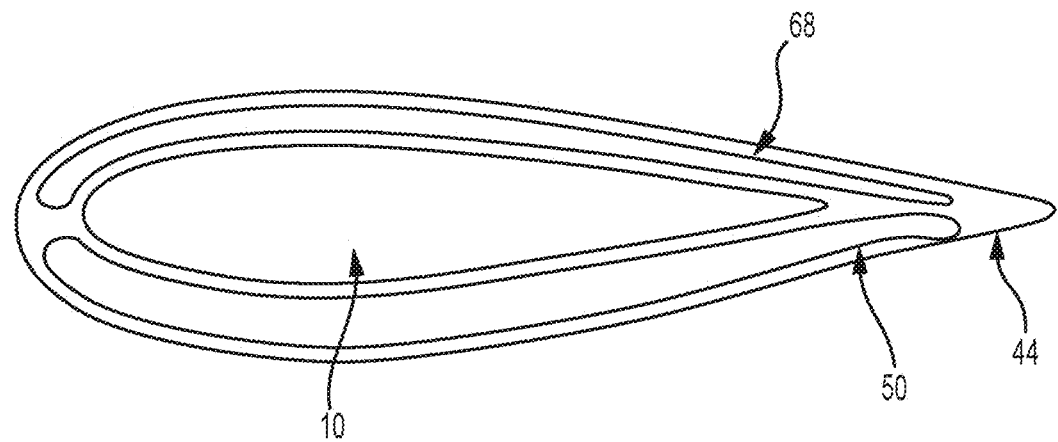
FIGS. 4A and 4B show the geometry of internal dampeners.
Figure 4B:
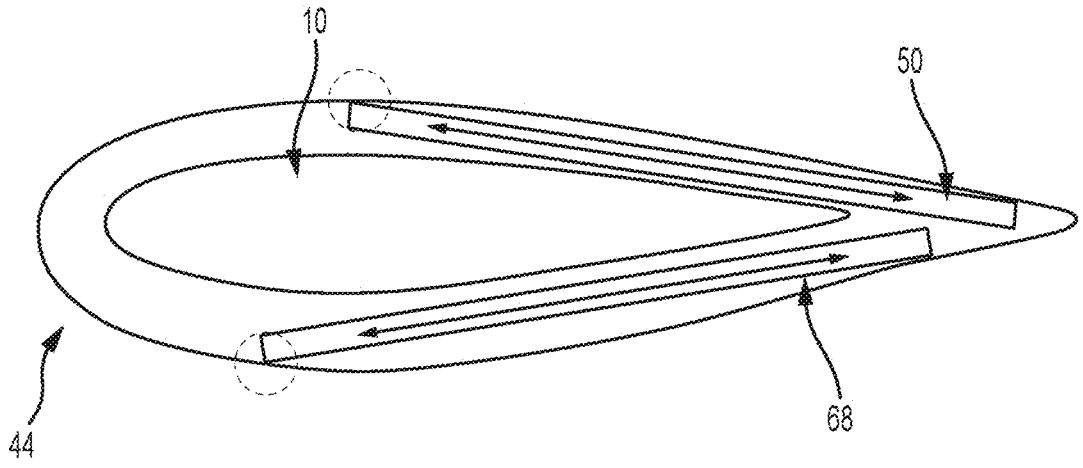

As shown in FIGS. 4A and 4B, the dampening system may comprise at least a first dampener 50, which is located within the dampening body 44 and positioned such that it has a component in the chordwise direction. This enables the dampener 50 to absorb the vibrations experienced by the wind turbine blade. In FIGS. 4A and 4B, different types of dampeners are shown, namely a liquid mass dampener, shown in FIG. 4A, and a tuned mass dampener, as shown in FIG. 4B. However, a wide range of different dampeners is envisioned to be used. As shown in FIGS. 4A and 4B, the length of the dampener can be made longer than existing dampener systems, due to it being arranged on the external surface to the wind turbine blade. This has the effect that internal components and structural features of the turbine blade do not affect or limit the shape and length of the dampener.

The dampener could also be placed with a component in the flapwise direction to alleviate flapwise vibrations. Further, placing a plurality of dampeners at different locations along the blade will allow a range of vibrations to be absorbed. As seen in FIGS. 4A and 4B a second dampener 68 is present.

Figure 5:
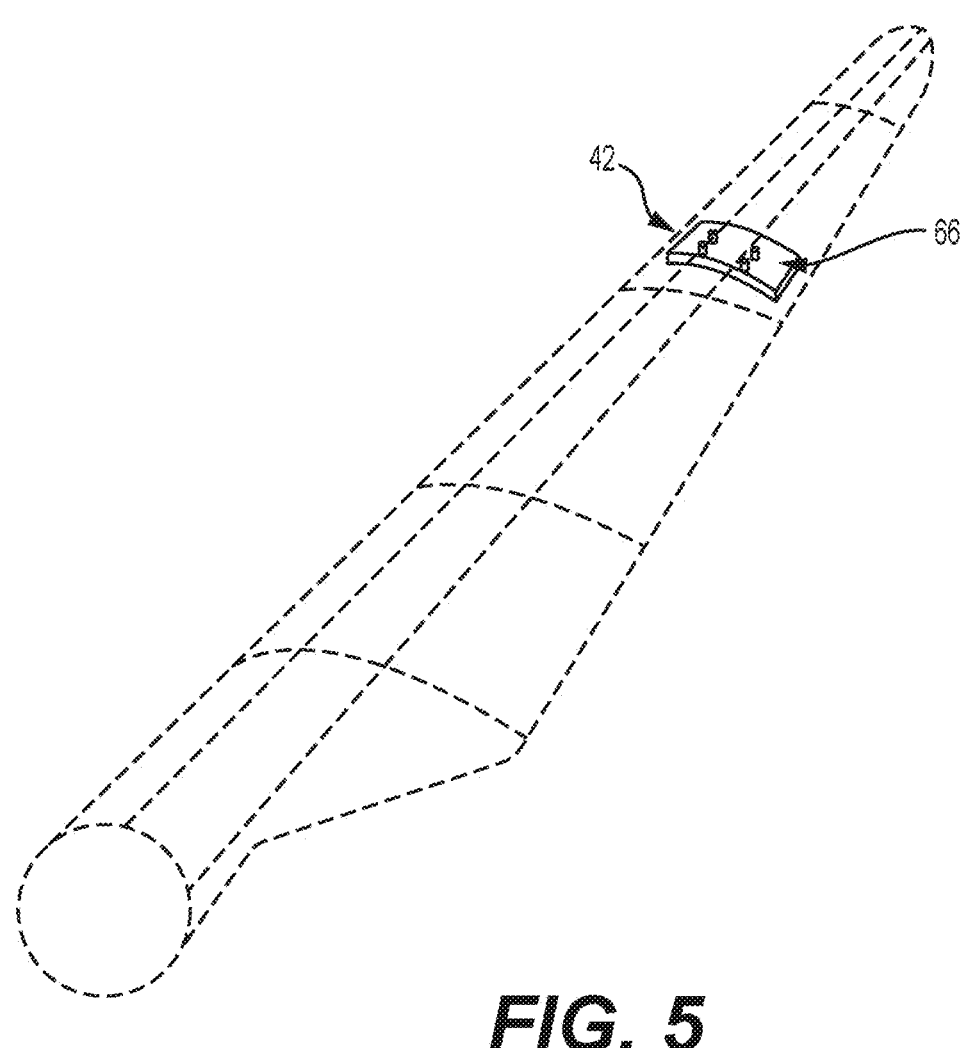
FIG. 5 shows an embodiment of the placement of the dampening system on part of the wind turbine blade.

As shown in FIGS. 4A and 4B, the dampening body fully encases the blade structure. However, the dampening body could also partially encase the blade structure or shell as shown in FIG. 5. Further, the dampener may locally protrude into the shell. As shown in FIGS. 4A and 4B, the dampening body or dampener may be dimensioned to follow the contour of the blade. This will create a snug-fit attachment to the wind turbine blade. Further, FIG. 4B shows the dampener 50 protruding into the shell, such that a portion of the dampener 50 is exposed to the exterior environment, as indicated by the dashed circles.

As shown in FIG. 5 the dampening system and dampener do not wrap around the shell but is only attached at the pressure side. In other embodiments, it could be attached to the suction side. The dampening body may comprise a fastener 66 connecting the blade dampening body 44 to the load bearing structure 46 of the blade or to the shell 48. As shown in FIG. 5 the fastener 66 is a bolt/nut connection, but other fasteners are envisioned, such as a screw connection, a glue connection, a clamping connection, an interlocking connection, etc.

In some embodiments, the dampening system is located within a fairing that provides a smooth transition and reduces drag and noise induced by the dampening system.

Figure 6:
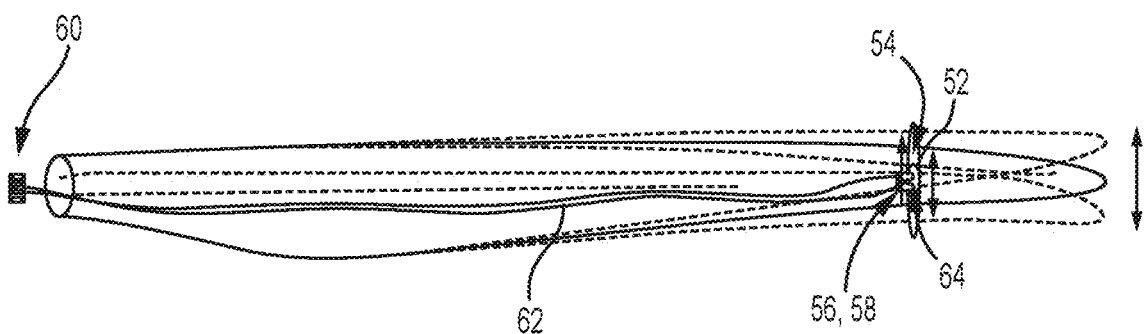
FIG. 6 shows an embodiment of a dampening system where a hydraulic actuator is used.

In FIG. 6 is shown a dampening system, wherein the dampener is a hydraulic actuator moving a mass along the chordwise direction of the blade. Other actuators are envisioned such as a pneumatic or electromechanical actuator. Moving the mass in a counter phase acceleration will cancel the vibrations of the blade. Changing the direction of the dampener and the actuator will allow different vibrations to be mitigated.

In FIG. 6 the dampening system comprises an acceleration sensor 56, a control valve 58, a hydraulic generator 60 for supplying pressurised hydraulic fluid to the hydraulic actuator by flow through the control valve. The control valve is configured to change the flow of the pressurised hydraulic fluid flowing in the hydraulic actuator to move the actuator 52 and thereby the mass in the same direction as the sensed acceleration by the acceleration sensor to create a counterphase reaction force that minimises or cancels the vibrations.

The hydraulic actuator can, in some embodiments, be controlled by a passive control valve and in other embodiments an active control valve. As shown in FIG. 6, first pressure supply lines 62 connect the hydraulic generator to the control valve comprising a high-pressure supply line and a low pressure return line and second pressure supply lines 64 connecting the valve to the actuator comprising a first and second supply line. The fluid will be controlled by the control valve connecting the first pressure supply lines to the second pressure supply lines, such that three configurations of the flow of the fluid are obtainable, viz. a first configuration, where the high-pressure supply line is connected to the first supply line and the low-pressure supply line is connected to the second supply line, a second configuration, where the high-pressure supply line is connected to the second supply line and the low-pressure supply line is connected to the first supply line; and a third configuration, where first pressure supply lines and second pressure supply lines are not connected or equally connected creating a zero-flow configuration. Thus, the first and second configurations have opposite flow directions and movement of the mass.

Figures 7A, 7B, 7C:
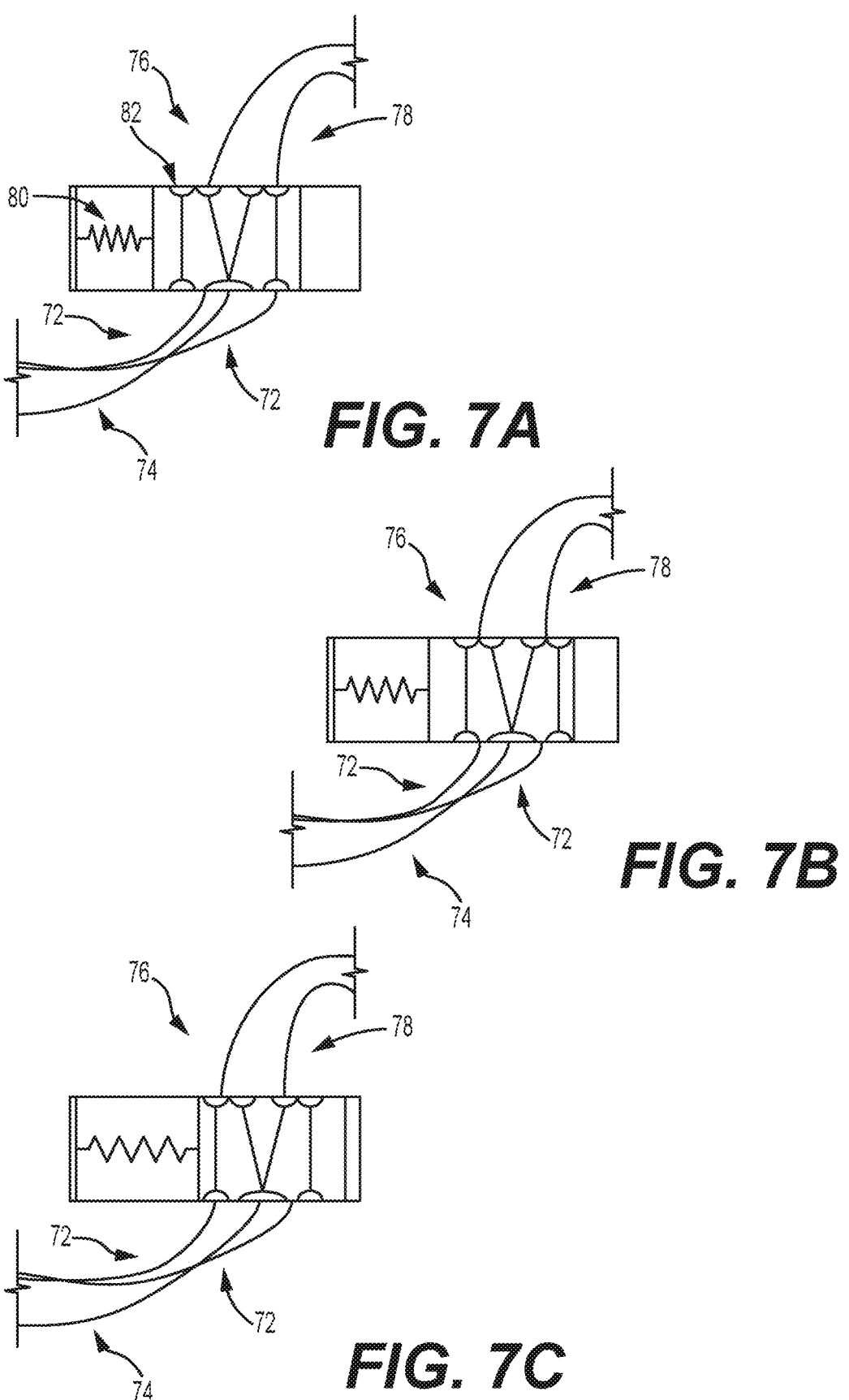
FIGS. 7A, 7B and 7C show a control valve used to passive control the flow of pressurized hydraulic fluid.

The control valve can be a passive or an active component. Shown in FIGS. 7A, 7B and 7C is an embodiment, wherein the control valve is a passive component in the form of a mass-activated control valve. The mass-activated control being integral formed with the acceleration sensor. As seen in FIGS. 7A, 7B and 7C, the control valve consists of an adjustable spring that can be adjusted, with regard to stiffness and zero-load point and pressure equilibration channels 82, allowing tuning of the dampening systems frequency response characteristics. The spring moves the equilibration channels in relation to the supply lines to align or misalign the first and second supply lines with the lowand high-pressure lines changing the flow of the hydraulic fluid. FIGS. 7A, 7B and 7C correspond to the first, third and second configurations, respectively. The actuator correspondingly moves the mass to create an opposite phase force that minimises or cancels the vibration.

The mass-activated control valve has the added benefit that no electrical wires or components are needed, making it resistant to lightning strikes.

Figure 8:
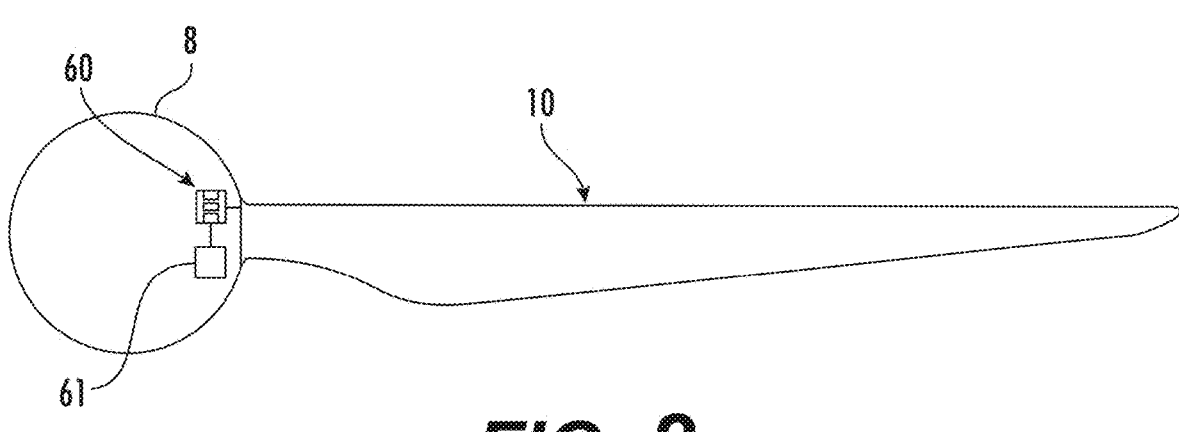
FIG. 8 diagrammatically illustrates an embodiment of the wind turbine blade, including a hydraulic generator housed within a hub joint.

The hydraulic generator 60 can be housed within a hub joint or a cavity of the blade, as shown in FIG. 8. Further, the system could comprise a hydraulic amplifier 61 connected to the hydraulic actuator for active controlling of the sensitivity of the dampening system changing for example the pressure of the hydraulic fluid. The geometry and placement of the equilibration channels can also be used as a controlling parameter.

In another embodiment, a controller controls the configuration of the mass-activated valve and/or the pressure ratio between the high-pressure line and low-pressure line based on the sensed acceleration by the acceleration sensor, which could be an electronic measurement. The controller further controls the hydraulic amplifier.

The placement of the dampening system and body could in principle be along the entire length of the wind turbine blade and will be placed based on the specific requirements of the blade, such as located within the spanwise outer 30% of the length of wind turbine blade, preferably 15%, most preferably 10%, and/or in an anti-node of the oscillation shape to be dampened.

LIST OF REFERENCES

2 wind turbine
4 tower
6 nacelle
8 hub
10 blade
13 shell
14 blade tip
15 tip end
16 blade root
17 root end
18 leading edge
20 trailing edge
30 root section
32 transition section
34 profiled section
36 tip section
40 shoulder
42 dampening system
44 blade dampening body
46 load bearing structure
48 blade shell
50 first dampeners
52 actuator
54 mass
56 acceleration sensor
58 control valve
60 hydraulic generator
62 first pressure supply lines
64 second pressure supply lines
66 fastener
68 second dampener

70 fairing
72 High pressure supply line
74 Low pressure supply line
76 first supply line
78 Second supply line
80 adjusting spring
82 pressure equilibration channels

The invention claimed is:

1. A wind turbine blade extending in a longitudinal direction between a root end and a tip end and comprising a shell having an outer surface defining a pressure side and a suction side, a leading edge and a trailing edge, a chord having a chord length extending between the leading edge and the trailing edge and a load-bearing structure extending in the longitudinal direction, the wind turbine blade further comprises a dampening system, the dampening system comprising:

a blade dampening body attached exteriorly to the load-bearing structure or exteriorly to the outer surface of the shell; and at least a first dampener located within the blade dampening body and positioned with a component in the chordwise direction of the wind turbine blade and adapted to absorb vibrational forces the wind turbine blade is subjected to, and wherein the first dampener protrudes into the shell, and wherein a portion of the first dampener is exposed to an exterior environment.

2. The wind turbine blade according to claim 1, wherein the dampening system is configured to remain part of the wind turbine blade or be attached to the wind turbine blade under design operational conditions for the wind turbine blade.

3. The wind turbine blade according to claim 1, wherein the first dampener is integrally formed with the blade dampening body.

4. The wind turbine blade according to claim 1, wherein the wind turbine rotor blade is a segmented wind turbine rotor blade, and wherein the blade dampening body is attached between wind blade sections of the segmented wind turbine blade.

5. The wind turbine blade according to claim 1, wherein the first dampener is a liquid dampener or a mass dampener.

6. The wind turbine blade according to claim 1, wherein a plurality of dampening systems or dampeners are attached along the wind turbine blade.

7. The wind turbine blade according to claim 1, wherein the blade dampening body has the shape of a fairing, dimensioned to create a smooth transition between the blade dampening body and the shell for reducing drag on the wind turbine blade.

8. The wind turbine blade according to claim 1, wherein the dampening body is located within a spanwise outer 30% of an overall length of wind turbine blade and in an anti-node of an oscillation thereof to be dampened.

9. A wind turbine comprising a plurality of wind turbine rotor blades, the wind turbine blade according to claim 1 being one of the plurality of wind turbine rotor blades.

10. The wind turbine blade according to claim 1, wherein the dampening body is located within a spanwise outer 10% of an overall length of wind turbine blade and in the anti-node of the oscillation thereof to be dampened.

* * * * *